United States Patent
Meyer et al.

(10) Patent No.: US 8,050,248 B2
(45) Date of Patent: Nov. 1, 2011

(54) RETRANSMISSION IN WIRELESS COMMUNICATION SYSTEMS

(75) Inventors: Michael Meyer, Aachen (DE); Reiner Ludwig, Huergen-wald (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1085 days.

(21) Appl. No.: 11/793,229

(22) PCT Filed: Dec. 17, 2004

(86) PCT No.: PCT/SE2004/001930
§ 371 (c)(1),
(2), (4) Date: Jun. 18, 2007

(87) PCT Pub. No.: WO2006/065188
PCT Pub. Date: Jun. 22, 2006

(65) Prior Publication Data
US 2008/0089314 A1  Apr. 17, 2008

(51) Int. Cl.
H04J 3/24 (2006.01)
H04B 7/00 (2006.01)
G08C 25/02 (2006.01)
H04L 1/18 (2006.01)
H04L 1/14 (2006.01)

(52) U.S. Cl. ........ 370/349; 455/522; 714/748; 714/749; 714/750

(58) Field of Classification Search .............. 370/349; 455/522; 714/748, 749, 750
See application file for complete search history.

(56) References Cited

U.S. PATENT DOCUMENTS

| 6,091,933 | A | 7/2000 | Sherman et al. |
| 6,678,249 | B2 * | 1/2004 | Toskala et al. ............... 370/236 |
| 7,079,848 | B2 | 7/2006 | Das et al. |
| 7,170,866 | B2 * | 1/2007 | Lee et al. ...................... 370/311 |
| 7,697,948 | B2 | 4/2010 | Wan et al. |
| 2001/0032325 | A1 * | 10/2001 | Fong et al. ..................... 714/18 |
| 2002/0049068 | A1 * | 4/2002 | Koo et al. ..................... 455/522 |
| 2003/0002461 | A1 * | 1/2003 | Chaponniere et al. ........ 370/335 |
| 2003/0039267 | A1 * | 2/2003 | Koo et al. ..................... 370/465 |
| 2003/0185175 | A1 | 10/2003 | Golitscheck et al. |
| 2004/0100911 | A1 | 5/2004 | Kwan et al. |
| 2004/0240416 | A1 * | 12/2004 | Derryberry et al. .......... 370/335 |

(Continued)

FOREIGN PATENT DOCUMENTS

| CN | 1552133 A | 12/2004 |
| EP | 1 209 936 | 5/2002 |
| EP | 1 465 369 | 10/2004 |
| WO | 03/105370 A1 | 12/2003 |

OTHER PUBLICATIONS

Comer, "Internetworking with TCP/IP", vol. 1: Principles, Protocols, and Architecture, Fourth Edition, 2000, pp. 181183.

(Continued)

Primary Examiner — Marisol Figueroa
(74) Attorney, Agent, or Firm — Nixon & Vanderhye, P.C.

(57) ABSTRACT

The invention relates to retransmissions in wireless communication systems. It is proposed to reduce the retransmission delays by utilizing feedback associated with a lower protocol layer than the conventional feedback messages of the ARQ functionality. After sending a packet from a transmitter towards a receiver, the transmitter monitors the link for a low-level control signal from the receiver. The low-level control information can e.g. comprise power control commands or be related to link quality indicators. Based on this signal, it is decided whether a retransmission is to take place, e.g. at the transmitter or at an external control unit.

30 Claims, 5 Drawing Sheets

U.S. PATENT DOCUMENTS

2005/0249296 A1* 11/2005 Axnas et al. ............ 375/260
2008/0123542 A1   5/2008 Karlsson
2008/0132184 A1   6/2008 Wan et al.

OTHER PUBLICATIONS

International Search Report for PCT/SE2004/001930 mailed Sep. 8, 2005.

Comer, "Internetworking with TCP/IP," $4^{th}$ ed., Prentice Hall, 2000, pp. 181-183.

European Patent Office Communication Pursuant to Article 94(3) dated Jun. 8, 2010 for European Application 04809103.7-2416.

Chinese Office Action and English translation thereof mailed Jul. 14, 2010 in corresponding Chinese Application 2004-800446040.7.

* cited by examiner

RETRANSMISSION IN WIRELESS COMMUNICATION SYSTEMS

This application is the US national phase of international application PCT/SE2004/001930 filed 17 Dec. 2004, which designated the U.S., the entire content of which is hereby incorporated by reference.

TECHNICAL FIELD

The present invention generally relates to data transfer in wireless communication systems and in particular to retransmission in Automatic Repeat reQuest (ARQ) systems.

BACKGROUND

Wireless communication systems are largely dependent on reliable transfer of packets. In case of transmission failure, the packet (or at least some information related to it) normally needs to be transmitted again. Of course, the most desirable scenario would be a communication system designed such that the need for retransmissions is eliminated. However, since it is impossible to always select the appropriate transmission power to ensure correct reception of a block, this is simply not feasible. For example, the maximum possible transmission power is typically limited and the power estimation often involves measurement errors, whereby the transmission error probability increases. There may also be unexpected interferers causing reception problems. Accordingly, retransmission mechanisms are essential for reliable data transmissions.

ARQ protocols are widely used in packet data communication systems to retransmit packets which have not been received correctly. There exist numerous ARQ protocols for wireless and wireline links, within the transport layer and also application layer protocols. Wireless link layer protocols comprising ARQ functionality are generally used in combination with Forward Error Correction (FEC) codes to ensure error-free delivery of received packets. This approach is commonly referred to as Hybrid ARQ (HARQ).

In accordance with ARQ and HARQ, the sending entity retransmits the data blocks after receiving a NACK feedback indicating transmission failures. Two different types of Hybrid ARQ can be distinguished. In HARQ Type I, the receiving entity discards the failed blocks immediately. Upon a NACK, the sender retransmits the data packet and the receiver tries again to decode the packet based on the retransmission. In HARQ Type II, the principle is instead to buffer the data blocks that were not received correctly and combine the buffered data with retransmissions. The soft combining procedure depends on which type of HARQ combining scheme that is used, e.g. Chase combining (HARQ-CC) or Incremental Redundancy (HARQ-IR).

Conventional ARQ protocols (including HARQ protocols) thus react with retransmissions when the sending entity receives a message from the peer ARQ entity that the data was not correctly received. To avoid protocol stalling there are normally also timers used at the sender to trigger a retransmission in case no feedback is received. Typically, such timers are started when the data unit is sent. If no feedback has been received within a predetermined period of time, a retransmission is initiated. In case feedback is received, the timer is stopped and depending on the feedback (positive or negative) it is decided whether there is to be a retransmission.

More specifically, there are three main ARQ protocol schemes, associated with different degrees of complexity. The simplest scheme is stop-and-wait ARQ. It allows sending one packet and waits for the feedback message, i.e., at the maximum one data packet is outstanding. Go-back-N ARQ allows to send up to N packets, but if a NACK is received it goes back to the negatively acknowledged packet and retransmits this and all subsequent packets regardless of whether they have been successfully received before or not. The most complex, but also best performing ARQ protocol is selective repeat ARQ. It uses a sliding window mechanism and can have also several packets outstanding at any point in time. Packets are positively or negatively acknowledged on an individual basis, e.g. by using bit maps in status messages. Typically selective repeat protocols require more complex timer solutions to protect against protocol stall conditions and to control unnecessary retransmissions.

The ARQ protocols operate with a certain round trip time, fixed or variable, which includes sending link layer data, processing at the receiver including generation of a response, transmitting the response, and processing the response at the data sender. Thus, every retransmission involves a delay associated with the round trip time. The fact that retransmissions increase the user perceived delay generally implies severe problems and leads to a degradation in data transfer performance.

Since retransmissions cannot be completely avoided, it would be very desirable to improve the quality and efficiency of the retransmissions and in particular to reduce retransmission delays. In this respect, the packet transfer of conventional telecommunication systems still is not entirely satisfactory and there is a need for an optimized retransmission mechanism.

SUMMARY

A general object of the technology described herein is to achieve improved packet transmissions in wireless communication systems. A specific object is to reduce the delay of retransmissions in wireless communication systems with ARQ functionality. Another object is to improve the reliability and precision associated with such retransmissions.

Briefly, a method for reducing retransmission delays in wireless communication systems is provided. The idea is to go beyond the conventional feedback information of the layer comprising the actual ARQ functionality (e.g. the data link layer) and utilize information held in or derived from feedback associated with a lower layer (e.g. the physical layer) for deciding whether a retransmission is needed. Such low-level control information reflects the transmission status of the PDU at the receiving unit and is typically sent faster and more frequent than the conventional higher-level ARQ status messages. The retransmission delay can be considerably reduced if such faster information is used to assist the ARQ process.

Upon transmission of a packet, the transmitter side monitors the link for low-level control information, for instance comprising power control commands or being related to link quality indicators. The low-level control signals are used as implicit indications of the transmission status and form the basis for an early retransmission decision or recommendation. By means of the proposed retransmission mechanism, it is not necessary to wait for an explicit ARQ status message in order to send a retransmission. If deemed appropriate with regard to the monitored low-level feedback, a retransmission related to the packet in question can instead be performed without having received an ARQ response message, i.e. while the transmitter is waiting for the ARQ message.

In a single-hop embodiment of the technology described herein, the communication protocols for the low-level signaling and the ARQ are terminated in the same nodes, whereby the proposed retransmission mechanism is substantially confined to communication between two logical/physical nodes. The monitoring of the low-level control signal and interpreting of this signal into a retransmission decision in accordance with the technology described herein is typically performed by either the base station or the mobile terminal. In another embodiment, the receiver of the low-level control information is logically or even physically a different node from the one where the higher-level ARQ protocol is terminated. In this case the low level control information is preferably evaluated at the termination point of the low-level control information and based on the evaluation, an indication for a required retransmission is communicated to the ARQ sender, which then uses this information in order to decide whether a retransmission is to be performed.

In a particular embodiment, the low-level control information is used not only as an indication for whether there is to be a retransmission or not, but also as an indication of the amount of retransmission data that is estimated to be required. Thereby, the system efficiency can be increased by choosing an appropriate amount of retransmission data.

According to other aspects of the technology described herein, communication units and a communication system with means for reducing retransmission delays are provided.

BRIEF DESCRIPTION OF THE DRAWINGS

The technology described herein, together with further objects and advantages thereof, is best understood by reference to the following description and the accompanying drawings, in which.

DETAILED DESCRIPTION

For the purpose of this disclosure, a transmission is the first transmission of a particular protocol data unit (PDU) characterized by a sequence number or a corresponding identifier. The term retransmission refers to any further transmission related to the PDU with this sequence number. This includes retransmissions of the exact coded version of the PDU (e.g. with HARQ Type 1) as well as retransmissions of a new coded version of the PDU. The size of the retransmission may be the same or different from the first transmission. Furthermore, the terms ARQ, ARQ protocol, etc will in the following be used in their general meaning, referring to ARQ and/or HARQ functionality.

Figure 1:
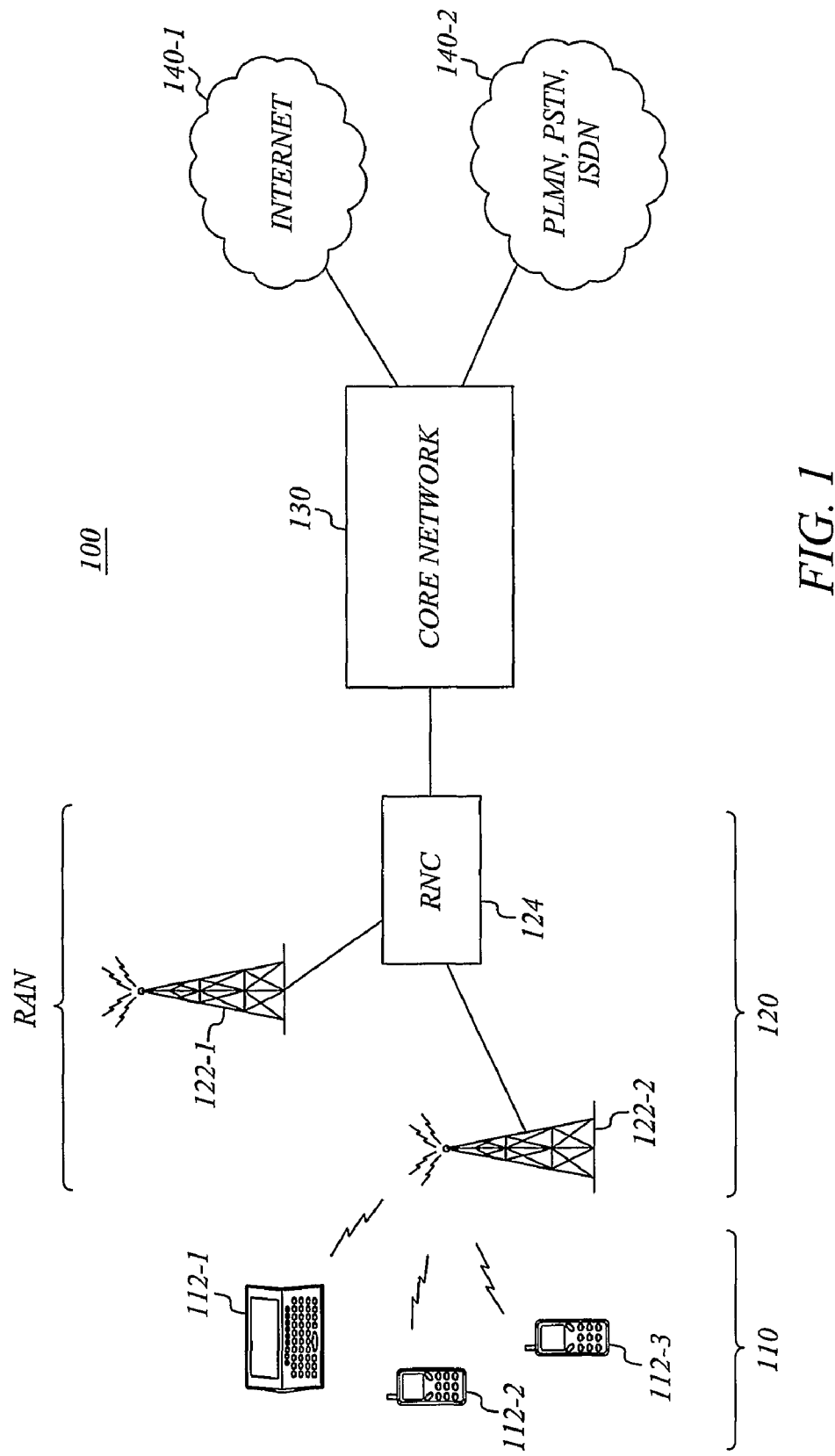
FIG. 1 is a schematic overview of an example WCDMA communication system in which the technology described herein can be used.

FIG. 1 is a schematic overview of an example WCDMA communication system in which the technology described herein can be used. The illustrated system 100 comprises a Radio Access Network (RAN), e.g. a Universal Terrestrial Radio Access Network (UTRAN), and a core network 130. The RAN performs radio-related functions and is responsible for establishing connections between user equipment 112, such as mobile phones and laptops, and the rest of the network. The RAN typically contains a large number of Base Transceiver Stations (BTS) 122, also referred to as Node B, and Radio Network Controllers (RNC) 124. Each BTS serves the mobile terminals within its respective coverage area and several BTS are controlled by a RNC. Typical functions of the RNC are to assign frequencies, spreading or scrambling codes and channel power levels.

The RNC 124 provides access to the core network 130, which e.g. comprises switching centers, support nodes and databases, and generally also some multimedia processing equipment. The core network communicates with external networks 140, such as the Internet, and Public Switched Telephone Networks (PSTN), Integrated Services Digital Networks (ISDN) and other Public Land Mobile Networks (PLMN). In practice, most WCDMA networks present multiple network elements and nodes arranged in much more complex ways than in the basic example of FIG. 1.

With the terminology used herein, the communication over a wireless communication link in a system like the illustrated packet-based communication system occurs from a transmitting side to a receiving side. In FIG. 1, this means that a PDU in an uplink scenario is send from a transmitting side 110 comprising the user equipment (terminal) to a receiving side 120 comprising the Node B and the RNC. In a downlink scenario, on the other hand, the transmitting side 120 is the side of the radio access network with the Node B and the RNC, whereas the terminal belongs to the receiving side 110.

In wireless systems, like the above-described WCDMA system for example, there is various kinds of feedback on different protocol layers. Most communication systems follow the networking framework of the Open System Interconnection (OSI) model. OSI was developed as an ISO standard the intention of which was to become the universal standard for worldwide communication but it has rather become a reference model for all other protocols.

In accordance with the OSI model, communication protocols are implemented in seven layers listed in Table 1 [1]. The user application is located above the top layer and uses its facilities. Underneath the bottom layer is an underlying communication medium/physical link. Control is passed from one layer to the next, starting at the application layer in one station, proceeding to the bottom layer, over the physical link to the next station and back up the hierarchy. Each layer n provides a service to the layer n+1 immediately above it in the hierarchy by using the services of the layer n−1 below it. Layers communicate with each other by using predefined interface(s) and there is generally at least one protocol defined for each layer, which protocol governs the communication between peer entities. Most of the functionality in the OSI model exists in all current communication systems, although two or more OSI layers may sometimes be incorporated into one.

TABLE 1

| Layer no. | Layer name |
|---|---|
| L7 | Application |
| L6 | Presentation |
| L5 | Session |
| L4 | Transport |

| Layer no. | Layer name |
|---|---|
| L3 | Network |
| L2 | Data Link |
| L1 | Physical |

In this disclosure, special attention will be paid to the two lowest protocol layers in the OSI model, L2 and L1. The data link layer L2 provides for reliable transfer of data in frames/blocks over the physical link. Some important L2 tasks are transmission protocol management, error control, flow control and frame synchronization. The data link layer is sometimes divided into two sublayers: the Media Access Control (MAC), and the Logical Link Control (LLC) layer, respectively. In WCDMA, the data link layer L2 comprises the Radio Link Control protocol (RLC) and the Medium Access Control (MAC). Other communication systems may use other link layer protocols, with the same or a different denotation. The physical layer L1 provides the means for sending and receiving data on a carrier. It is responsible for FEC and modulation. It also deals with mechanical and electrical characteristics for establishing and managing the physical link and is concerned with transmission of unstructured bit streams over the physical link.

As mentioned in the background section, ARQ protocols (including HARQ protocols) are used in packet data communication systems to retransmit packets which have not been received correctly. Normally, these ARQ protocols initiate retransmissions of data blocks in response to NACK signals in feedback messages, which indicate incorrect reception, and in case no feedback is received there may be timers that are used to trigger a retransmission. The respective ARQ retransmissions are associated with problematic delays.

The technology described herein is based on the recognition that the retransmission delay can be reduced if some other information, faster than (i.e. received before) the ARQ feedback, is used as a complement to the ARQ feedback when determining whether a retransmission is required. Referring to the above description of the OSI layers, the ARQ functionality generally belongs to the data link layer L2 and is provided by the RLC protocol in WCDMA. An idea of the technology described herein is to go beyond the conventional feedback information of the layer comprising the actual ARQ functionality (e.g. the data link layer L2) and utilize information held in or derived from feedback associated with a lower layer (e.g. the physical layer L1) for retransmission purposes. As explained herein, retransmission of the PDU can take place based on information included in the low-level control signal, and that the included information has a primary functionality other than retransmission determination. Typically, L1 feedback is received much earlier than the L2 feedback used for the ARQ process and, as will be evident in the following, considerable advantages can be achieved if such faster information is used, in addition to the specific L2 ARQ feedback, as indications assisting the ARQ process.

Figure 2:
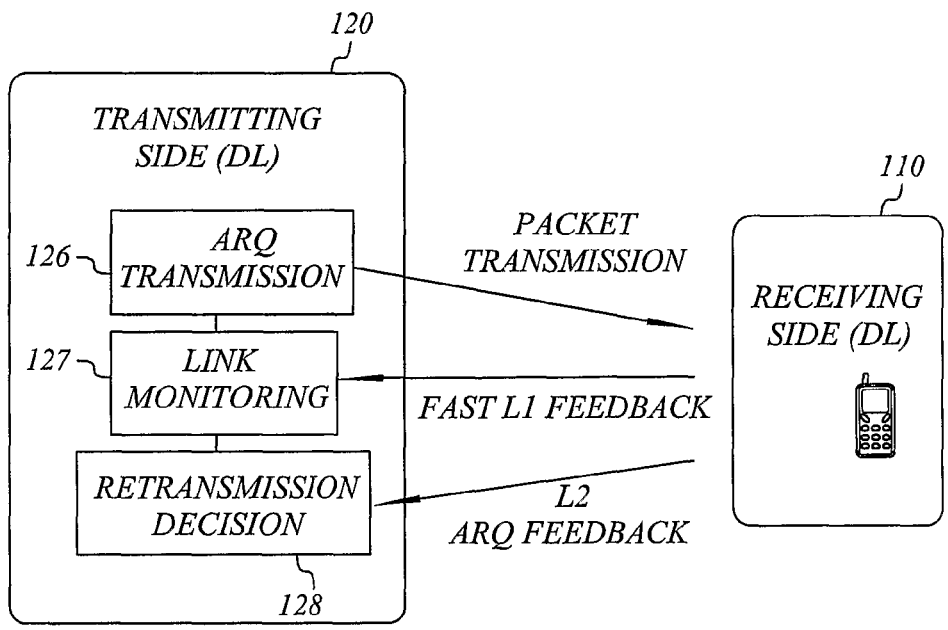
FIG. 2 illustrates feedback and retransmission functionality used in downlink packet transmission in accordance with an example embodiment.

The situation to which the technology described herein refers is illustrated in FIG. 2. The technology described herein relates to packet-based communication over wireless links and addresses situations where a transmitting unit on a transmitting side 120 transmits or tries to transmit a protocol data unit (PDU) (also referred to as packet) to a receiving unit on a receiving side 110 over a communication link. The transmitting side comprises means 126 for ARQ (re)transmission, means 127 for link monitoring and means 128 for deciding whether there is to be a retransmission.

Upon packet transmission from means 126 on the transmitting side 120 to the receiving side 110, there is conventional ("high-level") ARQ feedback e.g. L2 feedback, but also faster low-level control signals e.g. L1 feedback, from the receiving side. The high-level feedback comprises positive and/or negative acknowledgements. The low-level feedback, on the other hand, comprises control signals such as power control commands and channel quality indicators. Whereas the high-level feedback is sent through explicit messages, these control signals are typically a few bits integrated in the physical layer bit structure. These bits reflects the transmission status (failure/success) of the PDU at the receiving unit in the sense that they, in accordance with the technology described herein, are interpreted as indications of the transmission status based on which it can be decided whether a retransmission is to take place.

The technology described herein thus suggests to use implicit feedback in the form of low level control signals to improve the conventional ARQ retransmission mechanism which is based on explicit higher-level feedback messages. This means that interpretation actions need to be involved in order to translate the implicit control signals into retransmission measures/recommendations. For example, in WCDMA power control commands are sent much more frequently and faster than L2 ARQ messages. In case the monitoring means 127 of the sending side gets a relatively high number of power up commands this can be an indication that the data transmission will fail. This indication can be used by the deciding means 128 to trigger a L2 retransmission without having to wait for explicit L2 feedback that the transmission was not successful.

Accordingly, the technology described herein recognizes and exploits the fact that low-level control signals like power control commands can provide indications for required retransmissions while the sender is still waiting for L2 ARQ feedback messages, i.e. much earlier than with conventional solutions. This allows speeding up error correcting retransmissions, which improves the end-user perceived performance.

Whereas FIG. 2 illustrates downlink packet transmission, it is to be understood that the technology described herein is equally applicable on uplink packet transmission. Typically all participating units (mobile nodes, base stations, control nodes, etc.) are transceivers, comprising both receiving and transmitting functionality.

Figure 3:
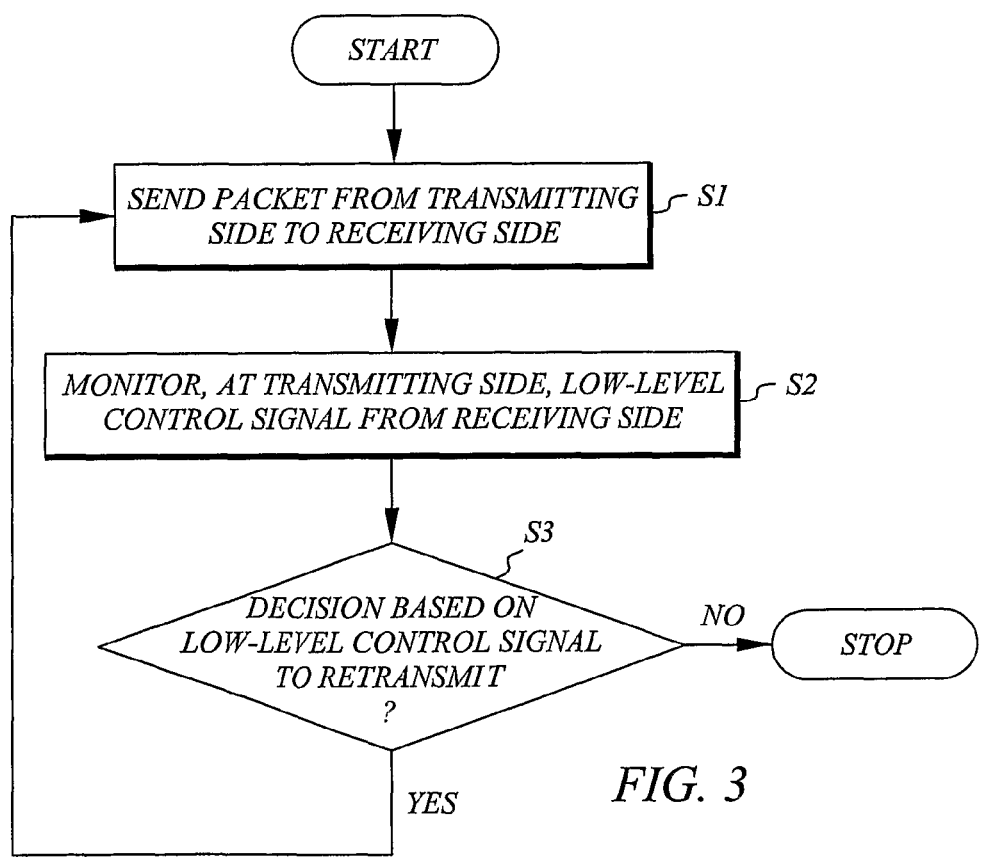
FIG. 3 is a flow chart of a method for reducing retransmission delays according to an example embodiment.

FIG. 3 is a flow chart of a method for reducing retransmission delays according to an embodiment of the technology described herein. In a first step S1, a packet (PDU) is send from a transmitting side towards a receiving side over a communication link. The transmitting side monitors the communication link for a low-level control signal from the receiving side in step S2. "Low-level" means that the signal is associated with a lower protocol layer than the layer of the (conventional) ARQ retransmission functionality. Based on the low-level control signal, it is decided whether a retransmission is to take place in step S3. The decision can for instance be performed at the actual transmitting unit or at another communication unit on the transmitting side in a way that will be described more in detail below with reference to FIGS. 7 and 8. Following step S3, there are two alternatives, depending on if there is to be a retransmission. If the answer is no, the procedure is terminated. (This normally means that the retransmission procedure for the packet based on fast low-level feedback is stopped, but that the transmitting side remains waiting for the slow high-level feedback.) If, on the other hand, the answer is yes, the procedure returns to step S1. The described retransmission process is normally a more or less continuously ongoing procedure, initiated by the transmission of a PDU and then updated by dynamic information in the form of low-level control signals.

It is evident to the skilled person that the flow chart in FIG. 3 gives a somewhat simplified view of the overall retransmission functionality. Normally, the retransmission method of the technology described herein interacts with the high-level ARQ feedback messages. The monitoring and deciding steps are performed while the transmitting side is in a waiting state with regard to the explicit feedback of the ARQ retransmission functionality. In other words, the low-level control signals are used for early retransmission decisions while the sender is still waiting for high-level ARQ feedback. If an explicit ACK/NACK-signal later arrives, this may of course still affect the transmission approach taken towards the PDU.

In a particular embodiment, the low-level control information is used not only as an indication for whether there is to be a retransmission or not but also as an indication of the amount of retransmission data that is estimated to be required. If the low-level control signal for example indicates that quality of the previous transmission is very bad, this may indicate a need for a larger amount of data in the following transmission. Provided that it is decided that a retransmission is needed, the amount of data will be selected when the retransmission is due to take place. By taking indicators in the form of low-level control signals into account when deciding on the amount of data, the transmission efficiency of the system can be further increased.

It should be mentioned that the technology described herein is applicable also to situations where there is not a one-to-one mapping relationship between the incoming PDU and the monitored low-level control signal. The PDUs may for example be received at a rate faster than the sampling of the low-level control signal for a certain period of time, whereby more than one PDU are mapped to one value of the low-level control signal. It can also be the other way around, i.e. one PDU is represented by more than one value of the low-level control signal.

Example Embodiment Using Power Control Commands

To illustrate some principles and aspects of the technology described herein, an example embodiment where power control commands is used as additional retransmission feedback in a WCDMA system will now be provided. In order to understand the example, we start with an explanation of the prior art mechanism for ARQ retransmissions.

Figure 4:
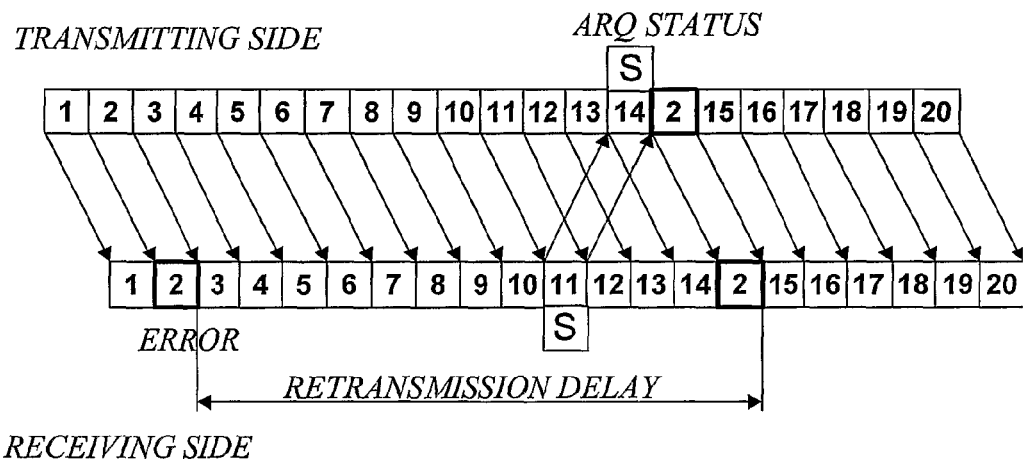
FIG. 4 illustrates conventional retransmission functionality.

FIG. 4 illustrates conventional handling of retransmissions in a WCDMA system or a similar communication system. The system sends one or more data PDUs in fixed transmission time intervals (TTIs). These typically have a duration of 10 or 20 ms for dedicated channels. In this example TTI=10 ms will be assumed. For simplicity, only one data block (numbered 1, 2, 3, . . . ) per transmission interval is shown.

The RLC protocol was designed with the goal of minimizing the feedback messages send on reverse link in order to save radio resources. Therefore, the status prohibit timer typically controls that only one status report is sent during one RLC round trip time. The RLC round trip time is roughly 10-15 times longer than the transmission time interval of 10 ms. Assuming a one-way transmission delay of 50 ms, retransmissions can therefore easily add a delay of two to three times the delay needed for the original transmission.

In the illustrated example, there is a failure in the transmission of block 2. However, the ARQ status report is not sent until about 0.1 s after this erroneous block transmission. This results in a comparatively long retransmission delay, indicated by an arrow in FIG. 4. Even if a conventional timer were to be used in order to trigger a retransmission if no ARQ response is received for a predetermined period of time, this time period would be of the same order as the retransmission delay, because these timer values need to be at least as large as the round trip time of the ARQ protocol layer.

Figure 5:
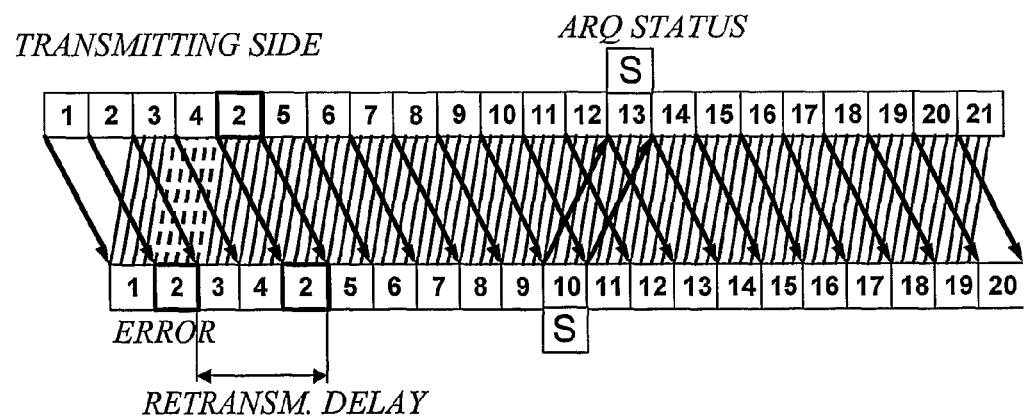
FIG. 5 illustrates retransmission functionality according to an example embodiment.

FIG. 5 illustrates handling of retransmissions according to an example embodiment of the technology described herein. The technology described herein is based on the observation that there is feedback information sent more frequently and also faster. For example, power control commands are sent with a frequency of 1500 Hz, i.e. 15 times per 10 ms. Moreover, since no long interleaving is performed for the physical layer control information, these bits are received much faster than L2 information, which has to adhere to the principles of L2 data transmission (interleaving). The power control commands are in FIG. 5 represented by the narrowly spaced lines between receiving side and transmitting side.

Like before, there is an error in the transmission of block 2. This is practically immediately reflected in the power control commands send from the receiving side, normally as an increased number of power up commands for a predetermined period of time. The low-level feedback comprising indications of the failure in the transfer of block 2 is represented by dashed lines in FIG. 5. By monitoring the low-level control information and using it as an indication for retransmission, block 2 is in this example retransmitted with a delay more than four times smaller than the retransmission delay experienced when the system has to await the L2 ARQ status message according to the prior art. Thus, by using the information carried in power control commands as indicator for ARQ retransmission the retransmission process can be speeded up considerably. This results in a reduction in the user perceived delay and an improved data transfer performance. The gain of the described approach in accordance with the technology described herein is especially significant when the delay between the reception of feedback based on power control commands and the ARQ feedback is large.

Example Embodiment Using Link Quality Indicators

In another example embodiment, the low-level control signal refers to one or several parameters related to the wireless communication link between the transmitting and receiving side and the quality thereof. Such link quality indicator(s) used in accordance with the technology described herein can for instance relate to at least one of modulation mode, coding rate, signal-to-noise ratio, and carrier-to-interference ratio.

In a preferred embodiment, the link quality indicators are parameters of the kind used for selection of modulation and/or coding schemes. The transmission status can, for example, be determined by the value or behavior of parameters related to the modulation and/or FEC. As an example, assume that transmission takes place with 64 QAM and code rate 3/4 and the link quality indicator(s) indicates that a lower modulation and/or stronger FEC, such as QPSK and code rate 1/2, should be used. Then, this is a strong indication that the channel has deteriorated, which may serve as basis for a retransmission decision or recommendation.

In the above example, the receiving side communicates a recommendation on modulation mode and coding rate to the transmitting side, whereafter this recommendation can be used in a retransmission decision (as well as in the selection of modulation mode and coding rate). The recommendation on modulation mode and coding rate can for instance be determined at the terminal (uplink) or at Node B (downlink) based on measured values of the signal-to-noise ratio, carrier-to-interference ratio or a corresponding quality parameter.

In another example embodiment, the signal-to-noise ratio or carrier-to-interference ratio (or a corresponding quality parameter) is sent, but not a recommendation on the modulation scheme or coding rate. The link quality indicator, e.g. the signal-to noise or carrier-to-interference ratio, may thereafter be used as an indication of the need for retransmission, either directly or, alternatively, through parameters related to the modulation mode and/or coding rate derived based on the transmitted link quality indicator. A need for retransmission would normally be reflected by a low value of the signal-to-noise or carrier-to-interference ratio.

Single-hop Scenario

Figure 6:
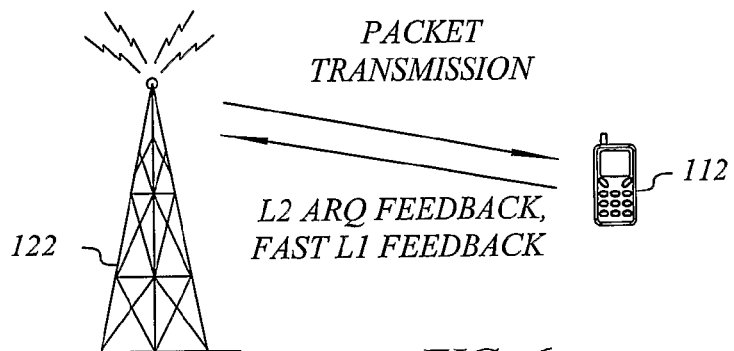
FIG. 6 illustrates downlink transmission in a single-hop scenario in accordance with an example embodiment.

There are several different architectural embodiments of the technology described herein, depending on the logical and/or physical arrangement of the involved communication protocols. The most straightforward set-up is a single-hop scenario, illustrated in FIG. 6, where the low-level control signals and the high-level functionality (with ARQ) are exchanged between a transmitter unit 122 at the transmitting side and a receiver unit 112 at the receiving side. In other words, the involved low-level (e.g. L1) protocols and the high-level (e.g. L2) protocols are terminated in the same pair of nodes 112, 122.

When implemented in a single hop scenario, the proposed retransmission mechanism will thus substantially be confined to communication between two logical or physical nodes, typically the mobile terminal (user equipment) 112 and the base station (Node B) 122. In uplink communication, the terminal send PDUs to the base station and receives low-level control signals from the base station. Similarly, in downlink communication (FIG. 6) the base station sends PDUs to and receives low-level control signals from the terminal. The monitoring of the low-level control signal and interpreting of this signal into a retransmission decision in accordance with the technology described herein will consequently be performed at the base station (downlink communication) or at the mobile terminal (uplink communication).

Noticable is that the information can be used also in case no NACK/ACK has been received at all to determine whether and how much information should be send in the next transmission. For example, with HARQ Type II based on incremental redundancy, the receiver has to perform soft combining. This requires that packet control information needs to be signaled out of band. In case this control information is not received correctly, the data transmission is useless and wasted. Also, in this case the receiver can not signal ACK/NACK information to the sender, because it does not know whether the information was addressed to it. Still low-level control data is exchanged between the two peers. Consequently, the low-level control information can be used as an indication for the success or failure of a transmission and thus form the basis of a retransmission decision. In particular the amount of retransmission data can be adapted to meet the current channel conditions. In this way the transmission delay of a HARQ single hop link transmission can be decreased by using low-level control information.

Multi-hop Scenario, e.g. WCDMA

Other architectural embodiments refer to a multi-hop or "double-hop" scenario, where the low-level control signaling and the higher-level ARQ protocol are terminated in logically or even physically different nodes at the transmitting and/or receiving side.

In WCDMA, for example, the ARQ is situated in the RLC Protocol which is terminated in the RNC and the user equipment (UE). However, power control commands are exchanged between the NodeB and the UE. Therefore, the architecture is a bit more complex than the single-hop case where ARQ protocol and the air interface are terminated in the same nodes. To describe the technology described herein in this context, uplink and downlink transmission will be treated separately. The functional units of a WCDMA system will be used for exemplifying purposes but it is evident to the skilled person that corresponding (current or future) transceiver nodes can be used instead.

Uplink Transmission

If data is transmitted in uplink direction, the RLC entity in the UE transmits one or more PDUs in one transmission time interval (TTI) towards the RLC entity in the RNC. The RNC sends the corresponding ARQ feedback messages describing the transmission status of the received PDUs to the UE. However, the low-level control information is provided by the NodeB. For example, during an on-going transmission the NodeB constantly sends power control commands which indicate whether the sender should increase or decrease the transmission power by a preconfigured amount.

Returning to FIG. 1, in this embodiment a PDU is thus send from a terminal 112 on the transmitting side 110 towards a first communication node (RNC) 124 with ARQ functionality on the receiving side 120. After sending the PDU, the terminal monitors a low-level control signal from a second communication node (Node B) 122 on the receiving side. Based on the low-level control signal, the terminal decides whether a retransmission of the PDU is to take place. In response to a decision in favor of a retransmission the terminal retransmits the PDU towards the RNC without having received an ARQ response message from the RNC for the PDU.

Since the NodeB and the RNC are typically separate and remote physical nodes, further delays will be introduced to the conventional ACK/NACK response messages received at the UE. The low-level control signaling reflecting the quality of the received signal during which the respective PDUs have been sent arrives much earlier at the UE than the ARQ feedback messages from the RNC. A retransmission decision according to the technology described herein based on low-level control information can be taken while the RLC sender is still waiting for RLC feedback from the RNC.

Downlink Transmission

Figure 7:
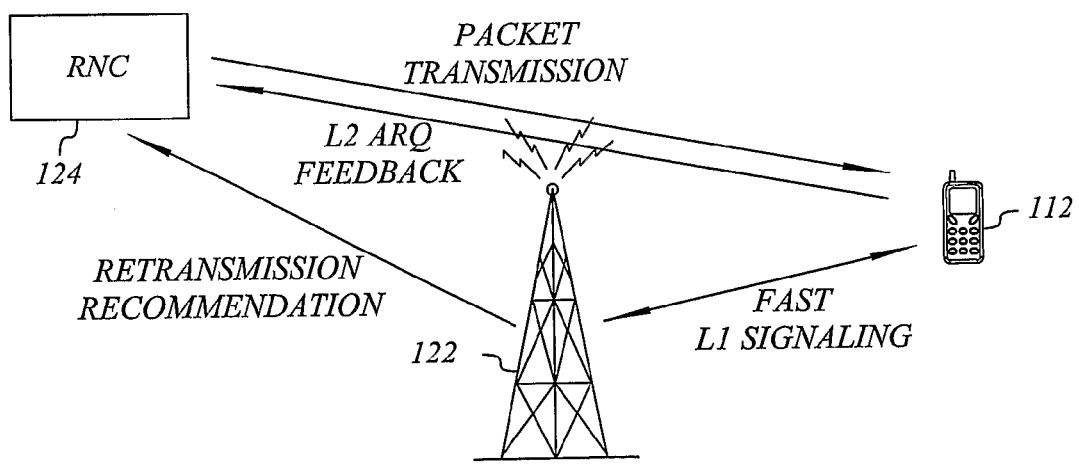
FIG. 7 illustrates downlink WCDMA communication in accordance with an example embodiment.

FIG. 7 illustrates downlink WCDMA communication in accordance with an example embodiment of the technology described herein. The RLC entity in the RNC 124 transmits one or more PDUs in one transmission time interval (TTI) towards the RLC entity in the UE 112. The UE 112 responds with the corresponding ARQ feedback, but also with power control information. However the RLC feedback is sent to the RNC 124 while the power control information is sent to the Node B 122.

Normally, the power control information will not be forwarded to the RNC 124 and the low-level control information needs to be evaluated at the termination point thereof, i.e. at Node B 122. Based on the evaluation, an indication for a required retransmission is then communicated from Node B 122 to the ARQ sender, i.e. the RNC 124, which typically uses this information/recommendation in a final decision on whether there is to be a retransmission.

For downlink transmission in a multi-hop (e.g. WCDMA) scenario, the procedure of the technology described herein will therefore typically be extended with a further step of signaling an indication of transmission status based on the low-layer control signal between two communication nodes 122, 124 at the transmitting side. Preferably, the Node B 122 takes a decision on retransmission and, as soon as it is estimated with a certain probability that the data contained in one TTI was not successfully transmitted, signals a recommendation for retransmission together with a unique identifier to indicate which PDU(s) that were affected to the RNC 124, see FIG. 7. The RNC 124 can then issue a retransmission of the PDU(s). The PDU identification can for example by accomplished by means of a time stamp, a PDU sequence number, a frame number or an equivalent identifier for the PDU.

In an alternative embodiment (not shown), the Node B communicates the low-level control signal directly to the RNC, without making any interpretations. The indication of transmission status transmitted to the RNC can thus comprise the low-level control signal itself, processed or not. In this case both interpretation of the low-level control signal and deciding upon retransmission is performed at the RNC.

Figure 8:
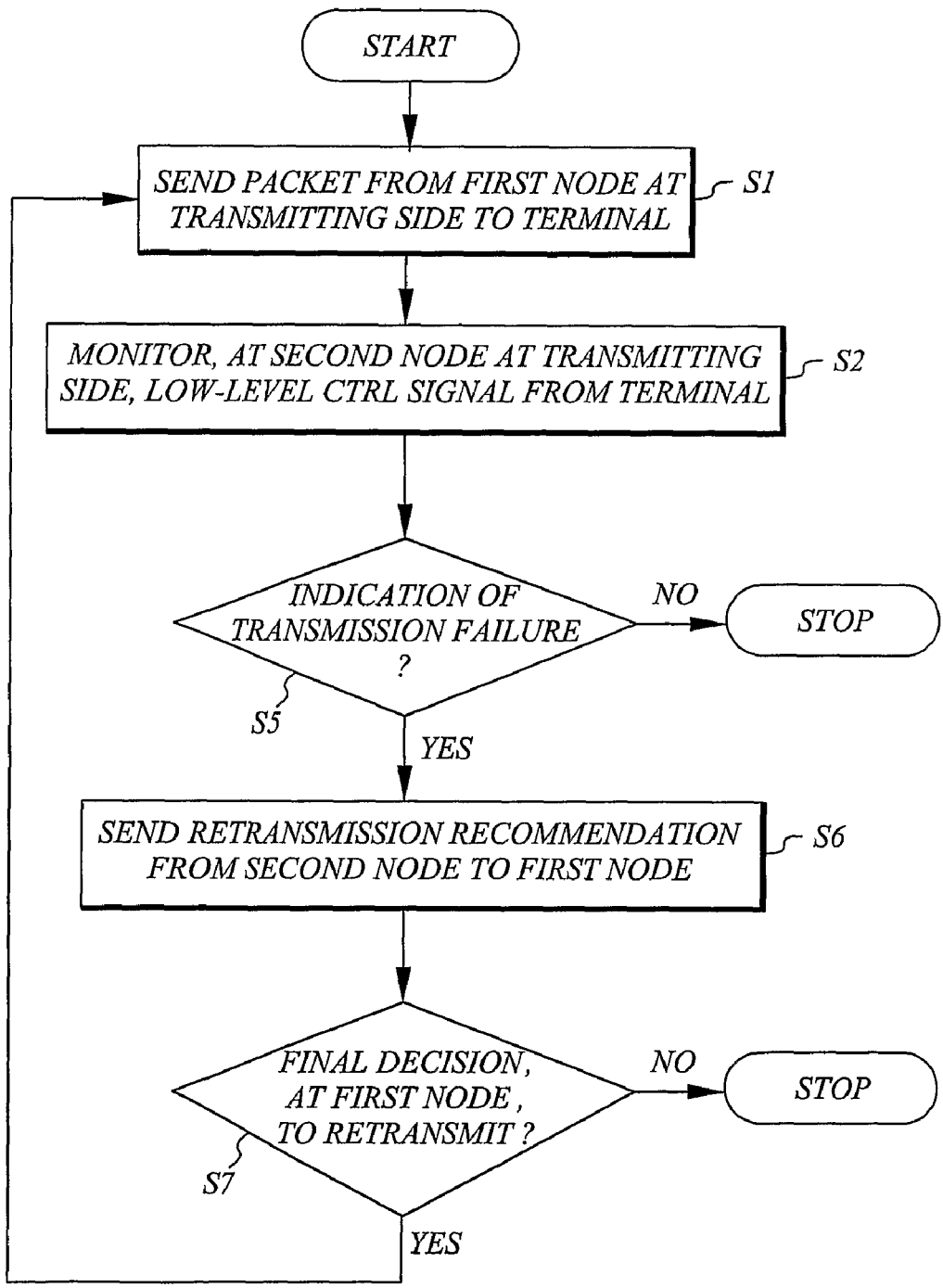
FIG. 8 is a flow chart of a method for reducing retransmission delays according to an example embodiment with split transmission functionality.

FIG. 8 is a flow chart of a method for reducing retransmission delays according to an embodiment of the technology described herein, useful for downlink transmission in scenarios with split functionality at the transmitting side. The first steps of packet transmission and link monitoring (S1, S2) correspond to steps S1, S2 of FIG. 3. However, the sending step S1 is performed by a first communication node on the transmitting side, whereas the monitoring step S2 is performed by second communication node on the transmitting side. The first communication node (e.g. an overlying control node) comprises ARQ functionality, whereas the low-level control signaling is terminated in the second communication node.

The second communication node interprets the low-level control signal from the receiving unit and determines if it indicates that there has been a transmission failure or not (step S5). If so, the second communication node sends a retransmission recommendation to the first communication node in step S6. The final decision about whether a retransmission is to take place lies at the first communication node, which typically uses the recommendation from the second communication unit as one of several input parameters. Step S7 asks if the first communication node has decided that there is to be a retransmission. If the answer is no, the procedure is terminated. If, on the other hand, the answer is yes, the procedure returns to step S1. As before, the retransmission process is normally a more or less continuously updated procedure. Moreover, the flow chart in FIG. 8 gives a simplified view of the overall retransmission functionality, where there can also be interactions with the high-level ARQ feedback messages, obvious to a person skilled in the art.

To sum up, in the downlink scenario the retransmission decision can be performed either at the communication node that monitors the low-level control signal or at a different communication node, which receives an indication of transmission status (e.g. failure), comprising or being based on the low-level control signal, from the monitoring communication node. Based on the low-level control signal, the monitoring communication node (e.g. Node B) performs an action that involves a (preliminary or final) retransmission decision or enables a retransmission decision at the control unit.

A particular embodiment of the technology described herein is designed to handle situations where the power setting is close to optimal, and the receiver therefore sends alternating up and down commands. In order to derive good quality estimates for the necessary retransmissions in such situations it is proposed to apply appropriate filters onto the low-level control signal. If the low-level control signal comprises power control commands, for example, one approach is to count the number of power up and power down commands, respectively. If the number of power up commands for a particular TTI is above a certain threshold, this is seen as an indication for an erroneous reception of the data transmitted in that TTI. Such an algorithm could be enhanced by taking the short-term history of power control commands from the previous one or more TTIs into account. The same holds for cases where low-level control signals other than power control commands are filtered.

It should be emphasized that the low-level control signals are to be seen as indications and not as reliable ACKs. Retransmissions based on low-level control signals such as power control indicators might interfere with the normal operation of the protocol comprising the ARQ functionality, e.g. RLC. In order to avoid unnecessary retransmissions, methods like the Retransmit Prohibit Timer need to be applied. Ultimately, the reliability control remains within the RLC protocol (or a corresponding protocol). For example, this means that only the RLC status message can acknowledge PDUs and can move the RLC window forward.

Although the technology described herein has been described with reference to specific illustrated embodiments, it should be emphasized that it also covers equivalents to the disclosed features, as well as modifications and variants obvious to a man skilled in the art. For example, the technology described herein is well suited for and has primarily been exemplified in connection with WCDMA communication. Nevertheless, it should be understood that it certainly is applicable also on other wireless, generally packet-based, communication systems with ARQ retransmission functionality. Thus, the scope of the invention is only limited by the enclosed claims.

ABBREVIATIONS

ACK—ACKnowledgement
ARQ—Automatic Repeat reQuest
BTS—Base Transceiver Station
FEC—Forward Error Correction
HARQ—Hybrid Automatic Repeat reQuest
ISDN—Integrated Services Digital Networks
ISO—International Standardization Organization
LLC—Logical Link Control
MAC—Media Access Control
NACK—Negative Acknowledgement
OSI—Open System Interconnection
PDU—Protocol Data Unit
PLMN—Public Land Mobile Networks
PSTN—Public Switched Telephone Networks
QAM—Quadrature Amplitude Modulation
QPSK—Quadrature Phase Shift Keying
RAN—Radio Access Network
RLC—Radio Link Control
RNC—Radio Network Controller
TTI—Transmission Time Interval
UTRAN—Universal Terrestrial Radio Access Network
WCDMA—Wideband Code Division Multiple Access

REFERENCE

[1] Corner, D. E., Internetworking with TCP/IP, $4^{th}$ ed., Prentice Hall, 2000, pp. 181-183.

The invention claimed is:

1. A method for reducing retransmission delays in a wireless communication system with Automatic Repeat reQuest (ARQ) retransmission functionality, comprising:
   sending a protocol data unit (PDU) from a transmitting side towards a receiving side;
   monitoring, at the transmitting side, a low-level control signal from the receiving side, the low-level control signal being associated with a lower protocol layer than the layer of the ARQ retransmission functionality; and deciding whether a retransmission of the PDU is to take place based on information included in the low-level control signal;

wherein the low-level control signal is a power control command and the included information comprises power control information;

wherein the deciding step in turn comprises determining the number of power up commands from the receiving side for a predetermined period of time, whereby a high number of power up commands is an indication for retransmission.

2. A method for reducing retransmission delays in a wireless communication system with Automatic Repeat reQuest (ARQ) retransmission functionality, comprising:

sending a protocol data unit (PDU) from a transmitting side towards a receiving side;

monitoring, at the transmitting side, a low-level control signal from the receiving side, the low-level control signal being associated with a lower protocol layer than the layer of the ARQ retransmission functionality; and deciding whether a retransmission of the PDU is to take place based on information included in the low-level control signal and on the basis of the information included in the low-level control signal retransmitting the PDU from the transmitting side towards the receiving side in accordance with the deciding step and without having received an ARQ response message for the PDU.

3. The method of claim 2, wherein the low-level control signal comprises feedback being faster or more frequent than explicit feedback of the ARQ retransmission functionality and reflecting the transmission status of the PDU at the receiving side.

4. The method of claim 2, wherein the ARQ retransmission functionality belongs to a data link layer and the low-level control signal is associated with a physical layer.

5. The method of claim 4, wherein the ARQ retransmission functionality comprises layer two ARQ feedback and the low-level control signal comprises layer one feedback.

6. The method of claim 2, wherein the low-level control signal is a power control command and the included information comprises power control information.

7. The method of claim 2, wherein the low-level control signal is a link quality indicator and the included information comprises link quality information.

8. The method of claim 7, wherein the link quality indicator relates to at least one of modulation mode; coding rate; signal-to-noise ratio; and carrier-to-interference ratio.

9. The method of claim 2, in a single-hop scenario, comprising:

sending the PDU from a transmitting node on the transmitting side towards a receiving node at the receiving side;

monitoring, at the transmitting node, the low-level control signal from the receiving node; and deciding, at the transmitting node, whether a retransmission of the PDU is to take place based on the low-level control signal.

10. A method for reducing retransmission delays in a wireless communication system with Automatic Repeat reQuest (ARQ) retransmission functionality, comprising:

sending a protocol data unit (PDU) from a transmitting side towards a receiving side;

monitoring, at the transmitting side, a low-level control signal from the receiving side, the low-level control signal being associated with a lower protocol layer than the layer of the ARQ retransmission functionality; the low-level control signal comprising a link quality indicator and the included information comprising link quality information;

deciding whether a retransmission of the PDU is to take place based on information included in the low-level control signal;

determining the amount of retransmission data based on the link quality information.

11. A method for reducing retransmission delays in a wireless communication system with Automatic Repeat reQuest (ARQ) retransmission functionality, comprising:

sending a protocol data unit (PDU) from a transmitting side towards a receiving side;

monitoring, at the transmitting side, a low-level control signal from the receiving side, the low-level control signal being associated with a lower protocol layer than the layer of the ARQ retransmission functionality; and deciding whether a retransmission of the PDU is to take place based on information included in the low-level control signal;

in an uplink scenario comprising:

sending the PDU from a terminal on the transmitting side towards a first communication node on the receiving side, said first communication node including ARQ functionality;

monitoring, at the terminal, the low-level control signal from a second communication node on the receiving side; and deciding, at the terminal, whether a retransmission of the PDU is to take place based on the low-level control signal.

12. The method of claim 11, wherein the low-level control signal is a power control command and the included information comprises power control information.

13. The method of claim 11, wherein the low-level control signal is a link quality indicator and the included information comprises link quality information.

14. A method for reducing retransmission delays in a wireless communication system with Automatic Repeat reQuest (ARQ) retransmission functionality, comprising:

sending a protocol data unit (PDU) from a transmitting side towards a receiving side;

monitoring, at the transmitting side, a low-level control signal from the receiving side, the low-level control signal being associated with a lower protocol layer than the layer of the ARQ retransmission functionality; and deciding whether a retransmission of the PDU is to take place based on information included in the low-level control signal;

in a downlink scenario, comprising:

sending the PDU from a first communication node on the transmitting side towards a terminal on the receiving side said first communication node including ARQ functionality;

monitoring, at a second communication node on the transmitting side, the low-level control signal from the terminal;

communicating a recommendation on retransmission of the PDU together with an identifier for the PDU from the second communication node to the first communication node; and deciding, at the first communication node, whether a retransmission is to take place based on the retransmission recommendation.

15. The method of claim 14, wherein the low-level control signal is a power control command and the included information comprises power control information.

16. The method of claim 14, wherein the low-level control signal is a link quality indicator and the included information comprises link quality information.

17. A wireless communication system with ARQ retransmission functionality and means for reducing retransmission delays, comprising:
means for sending a PDU from a transmitting side towards a receiving side;
means for monitoring, at the transmitting side, a low-level control signal from the receiving side, the low-level control signal being associated with a lower protocol layer than the layer of the ARQ retransmission functionality;
means for deciding whether a retransmission is to take place based on information included in the low-level control signal; and
means for retransmitting the PDU from the transmitting side towards the receiving side in accordance with the decision by the deciding means and without having received an ARQ response message.

18. The system of claim 17, wherein the low-level control signal comprises feedback being faster or more frequent than the explicit feedback of the ARQ retransmission functionality and reflecting the transmission status of the PDU at the receiving side.

19. The system of claim 17, wherein the ARQ retransmission functionality belongs to a data link layer and the low-level control signal is associated with a physical layer.

20. The method of claim 17, wherein the low-level control signal is a power control command and the included information comprises power control information.

21. The system of claim 17, wherein the low-level control signal is a link quality indicator and the included information comprises link quality information.

22. A wireless communication system with ARQ retransmission functionality and means for reducing retransmission delays, comprising:
means for sending a PDU from a transmitting side towards a receiving side;
means for monitoring, at the transmitting side, a low-level control signal from the receiving side, the low-level control signal being associated with a lower protocol layer than the layer of the ARQ retransmission functionality;
means for deciding whether a retransmission is to take place based on information included in the low-level control signal;
means for sending the PDU from a terminal on the transmitting side towards a first communication node on the receiving side, said first communication node including ARQ functionality;
means for monitoring, at the terminal, the low-level control signal from a second communication node on the receiving side; and
means for deciding, at the terminal, whether a retransmission of the PDU is to take place based on the low-level control signal.

23. A wireless communication system with ARQ retransmission functionality and means for reducing retransmission delays, comprising:
means for sending a PDU from a transmitting side towards a receiving side;
means for monitoring, at the transmitting side, a low-level control signal from the receiving side, the low-level control signal being associated with a lower protocol layer than the layer of the ARQ retransmission functionality;
means for deciding whether a retransmission is to take place based on information included in the low-level control signal;
means for sending the PDU from a first communication node on the transmitting side towards a terminal on the receiving side said first communication node including ARQ functionality;
means for monitoring, at a second communication node on the transmitting side, the low-level control signal from the terminal;
means for communicating a recommendation on retransmission of the PDU together with an identifier for the PDU from the second communication node to the first communication node; and
means for deciding, at the first communication node, whether retransmission is to take place based on the retransmission recommendation.

24. A communication unit with means for reducing retransmission delays arranged at a transmitting side in a wireless communication system with ARQ retransmission functionality, comprising:
means for monitoring a low-level control signal from a receiving side upon transmission of a PDU from the transmitting side towards the receiving side, the low-level control signal being associated with a lower protocol layer than the layer of the ARQ retransmission functionality; and
means for performing a retransmission decision based on information included in the low-level control signal;
means for sending the PDU towards the receiving side;
means for deciding whether a retransmission is to take place based on the low-level control signal; and
means for retransmitting the PDU towards the receiving side in accordance with the decision by the deciding means and without having received an ARQ response message for the PDU.

25. The communication unit of claim 24, wherein the low-level control signal comprises feedback being faster or more frequent than explicit feedback of the ARQ retransmission functionality and reflecting the transmission status of the PDU at the receiving side.

26. The communication unit of claim 24, wherein the ARQ retransmission functionality belongs to a data link layer and the low-level control signal is associated with a physical layer.

27. The communication unit of claim 24, wherein the low-level control signal is a power control command and the included information comprises power control information.

28. The communication unit of claim 24, wherein the low-level control signal is a link quality indicator and the included information comprises link quality information.

29. A communication unit with means for reducing retransmission delays arranged at a transmitting side in a wireless communication system with ARQ retransmission functionality, comprising:
means for monitoring a low-level control signal from a receiving side upon transmission of a PDU from the transmitting side towards the receiving side, the low-level control signal being associated with a lower protocol layer than the layer of the ARQ retransmission functionality;
means for performing a retransmission decision based on information included in the low-level control signal;
means for deciding whether a retransmission is to be recommended based on the low-level control signal; and
means for communicating a recommendation on retransmission of the PDU together with an identifier for the PDU to another communication unit at the transmitting side, the other communication unit including ARQ retransmission functionality.

30. A communication unit with means for reducing retransmission delays arranged at a transmitting side in a wireless communication system with ARQ retransmission functionality, comprising:

means for monitoring a low-level control signal from a receiving side upon transmission of a PDU from the transmitting side towards the receiving side, the low-level control signal being associated with a lower protocol layer than the layer of the ARQ retransmission functionality, the low-level control signal comprising a link quality indicator and the included information comprising link quality information;

means for performing a retransmission decision based on information included in the low-level control signal; and means for determining the amount of retransmission data based the link quality information.

* * * * *

UNITED STATES PATENT AND TRADEMARK OFFICE
CERTIFICATE OF CORRECTION

PATENT NO. : 8,050,248 B2
APPLICATION NO. : 11/793229
DATED : November 1, 2011
INVENTOR(S) : Meyer et al.

It is certified that error appears in the above-identified patent and that said Letters Patent is hereby corrected as shown below:

In Column 12, Line 57, delete "Corner," and insert -- Comer, --, therefor.

Signed and Sealed this
Sixth Day of March, 2012

David J. Kappos
*Director of the United States Patent and Trademark Office*